(12) United States Patent
Nishio et al.

(10) Patent No.: US 10,232,924 B2
(45) Date of Patent: Mar. 19, 2019

(54) ENGINE CONTROL DEVICE AND ENGINE CONTROL METHOD

(71) Applicant: SUZUKI MOTOR CORPORATION, Hamamatsu-Shi, Shizuoka (JP)

(72) Inventors: Masaya Nishio, Hamamatsu (JP); Tomohiko Miyaki, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 15/784,849

(22) Filed: Oct. 16, 2017

(65) Prior Publication Data

US 2018/0111670 A1    Apr. 26, 2018

(30) Foreign Application Priority Data

Oct. 25, 2016 (JP) ................. 2016-208570

(51) Int. Cl.
| | |
|---|---|
| *B63H 21/21* | (2006.01) |
| *B63H 21/14* | (2006.01) |
| *B63H 20/00* | (2006.01) |
| *F02D 41/02* | (2006.01) |
| *F02D 41/00* | (2006.01) |
| *F02D 41/22* | (2006.01) |
| *F02B 61/04* | (2006.01) |

(52) U.S. Cl.
CPC ............. *B63H 21/21* (2013.01); *B63H 21/14* (2013.01); *B63H 21/265* (2013.01); *F02D 41/009* (2013.01); *F02D 41/021* (2013.01); *F02D 41/22* (2013.01); *B63H 2021/216* (2013.01); *F02B 61/045* (2013.01); *F02D 2041/001* (2013.01); *F02D 2041/228* (2013.01); *F02D 2250/26* (2013.01)

(58) Field of Classification Search
CPC ....... B63H 21/21; B63H 21/14; B63H 21/265
USPC ............................................... 440/1
See application file for complete search history.

(56) References Cited

U.S. PATENT DOCUMENTS

| | | | | | |
|---|---|---|---|---|---|
| 5,257,607 | A | * | 11/1993 | Gillespie ............... | F02B 61/045 123/478 |
| 5,529,034 | A | * | 6/1996 | Sone ................... | F01L 1/34406 123/90.15 |
| 6,000,375 | A | * | 12/1999 | Isobe ....................... | F01L 1/34 123/322 |
| 6,332,352 | B1 | * | 12/2001 | Sano ......................... | G01L 3/00 73/114.15 |

(Continued)

FOREIGN PATENT DOCUMENTS

JP    H1182146 A    3/1999

*Primary Examiner* — Lars A Olson
*Assistant Examiner* — Jovon E Hayes
(74) *Attorney, Agent, or Firm* — Troutman Sanders LLP

(57) ABSTRACT

An engine control device includes an obtaining unit, a determining unit, and a control unit. The obtaining unit obtains model information on an engine based on a signal from a sensor, the sensor detecting a rotation of a camshaft unit. The determining unit determines whether the model information obtained by the obtaining unit matches stored model information. The control unit gives a warning to a user when the determining unit determines that the model information is not matched and controls the engine corresponding to the stored model information when the determining unit determines the model information is matched.

5 Claims, 6 Drawing Sheets

(56) References Cited

U.S. PATENT DOCUMENTS

| | | | |
|---|---|---|---|
| 6,855,020 B2* | 2/2005 | Kaji | B63H 21/213 |
| | | | 440/1 |
| 8,452,509 B2* | 5/2013 | Sujan | G01C 21/3469 |
| | | | 180/165 |
| 9,630,510 B2* | 4/2017 | Sukumaran | G06F 8/60 |
| 9,889,915 B2* | 2/2018 | Zhang | B63H 21/21 |
| 2003/0003822 A1* | 1/2003 | Kaji | B63H 21/213 |
| | | | 440/84 |
| 2004/0193338 A1* | 9/2004 | Kaji | B63H 20/08 |
| | | | 701/21 |
| 2008/0254690 A1* | 10/2008 | Kishibata | B63H 21/213 |
| | | | 440/1 |
| 2009/0117788 A1* | 5/2009 | Kaji | B63H 21/265 |
| | | | 440/1 |
| 2018/0111670 A1* | 4/2018 | Nishio | B63H 21/14 |

* cited by examiner

ENGINE CONTROL DEVICE AND ENGINE CONTROL METHOD

CROSS-REFERENCE TO RELATED APPLICATIONS

This application is based upon and claims the benefit of priority of the prior Japanese Patent Application No. 2016-208570, filed on Oct. 25, 2016, the entire contents of which are incorporated herein by reference.

FIELD OF THE INVENTION

The present invention relates to an engine control device and an engine control method.

BACKGROUND

In manufacturing engines mounted to a vehicle and an outboard motor, the engines having identical basic specifications are sometimes modified to have maximum horsepower and output characteristics so as to meet regulations on exhaust gas and maximum speed in destinations. For example, as a common method for modifying the maximum horsepower of the engine, there has been a process that restricts maximum engine speed of the engine and a process that restricts an ignition timing, fuel injection quantity, or air-intake volume. These processes are controlled based on programs stored in engine control devices. Accordingly, there has been a problem that a user illegally installs an engine control device that stores a high output program to an engine manufactured for low output, thus the engine is modified to a high-power engine. In this case, the engine fails to meet the regulations in the destination.

Japanese Laid-open Patent Publication No. 11-82146 discloses an engine model discrimination device that performs an operation comparing a pulse signal, which is unique to a gear having different number of teeth by each engine model, with the preliminarily recorded number of teeth, so as to discriminate the engine model. The engine model discrimination device of Patent Document 1 selects and executes an engine control program appropriate for the discriminated engine model after discriminating the engine model based on the operation result.

The engine model discrimination device of Japanese Laid-open Patent Publication No. 11-82146 is employed to ensure preventing or reducing the modification by replacing the engine model discrimination device. However, the engine model discrimination device of Japanese Laid-open Patent Publication No. 11-82146 is originally required to store a plurality of programs corresponding to the number of the engine models other than the necessary programs. Therefore, storage capacity requires to be ensured more than necessary for storing the programs, thus engine cost increases as the number of the engine models increases. Accordingly, for cost reduction, it is necessary to store the programs corresponding to the engine model to decrease the storage capacity. Thus, in Japanese Laid-open Patent Publication No. 11-82146, the cost reduction and the prevention of the engine modification are incompatible.

SUMMARY

The present invention has been made to solve the above-described problems, and an object of the present invention is to prevent or reduce illegal replacement of an engine control device without increasing a storage area for storing programs.

An engine control device of the present invention includes an obtaining unit, a determining unit, and a control unit. The obtaining unit obtains model information on an engine based on a signal from a detecting unit, the detecting unit detecting a rotation of a camshaft unit. The determining unit determines whether the model information obtained by the obtaining unit matches stored model information. The control unit gives a warning to a user when the determining unit determines that the model information is not matched and controls the engine corresponding to the stored model information when the determining unit determines that the model information is matched.

DETAILED DESCRIPTION

In the embodiment according to the present invention, an engine control device 70 obtains model information on an engine 13 based on a signal from a sensor 47 that detects a rotation of a camshaft unit 30, the engine control device 70 determines whether the obtained model information matches stored model information. When the model information is determined not to be matched, the engine control device 70 gives a warning to a user, and when the model information is determined to be matched, the engine control device 70 performs an engine control corresponding to the stored model information. According to the engine control device 70 of the embodiment, illegal replacement of the engine control device 70 ensures to be prevented or reduced without increasing a storage area for storing programs.

The following describes the embodiment with reference to the drawings. In the embodiment, a description will be given with an exemplary engine of an outboard motor mounted to a ship. Here, a plurality of models of engines are prepared such that the engines have identical basic specifications while the engine control device executes different programs on the respective engines, thus maximum outputs are different among the engines. In the embodiment, for example, three engines of different models, a low-power engine, a medium-power engine, and a high-power engine are prepared.

Figure 1:
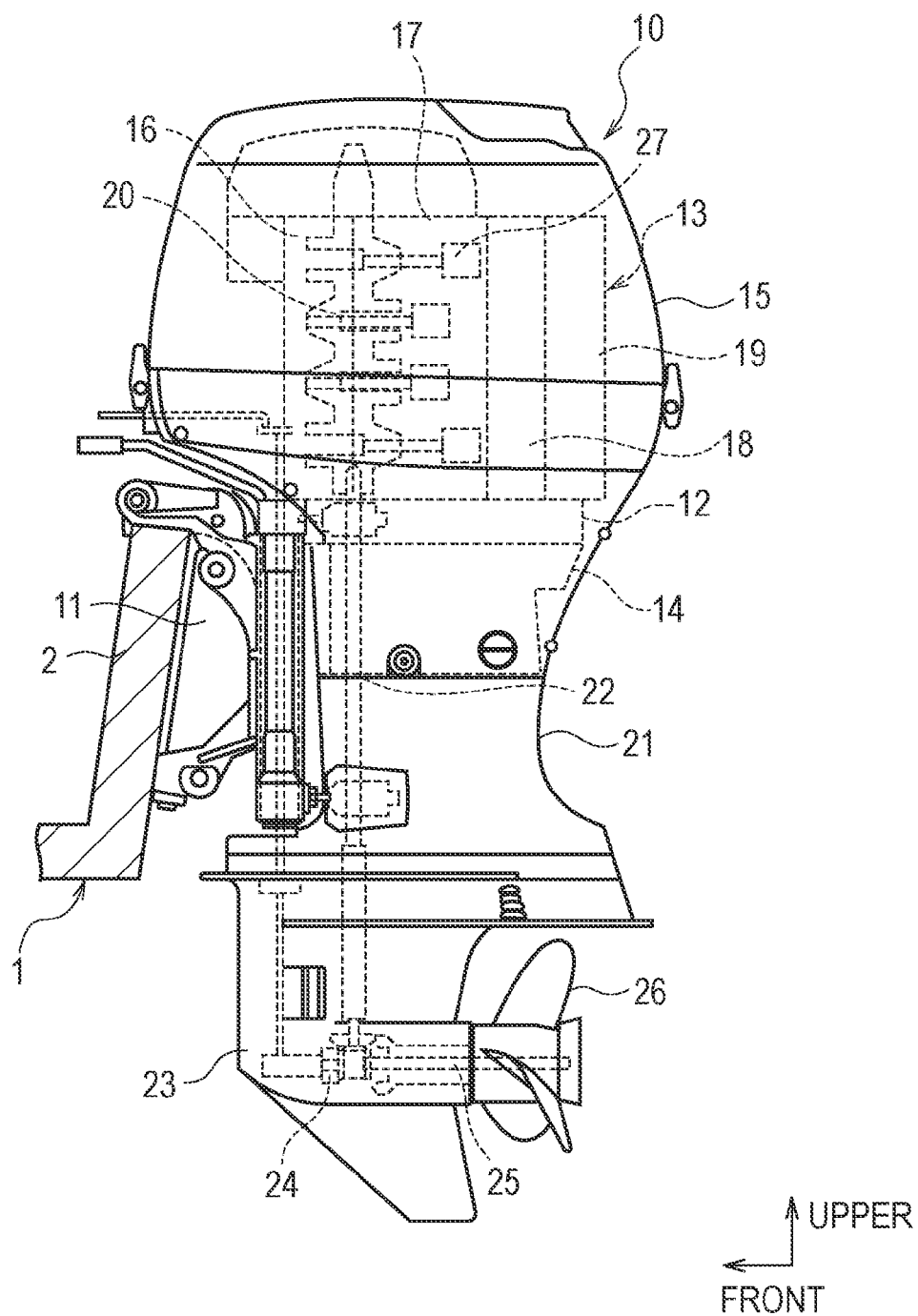
FIG. 1 is a left side view illustrating an exemplary outboard motor.
Figure 2:
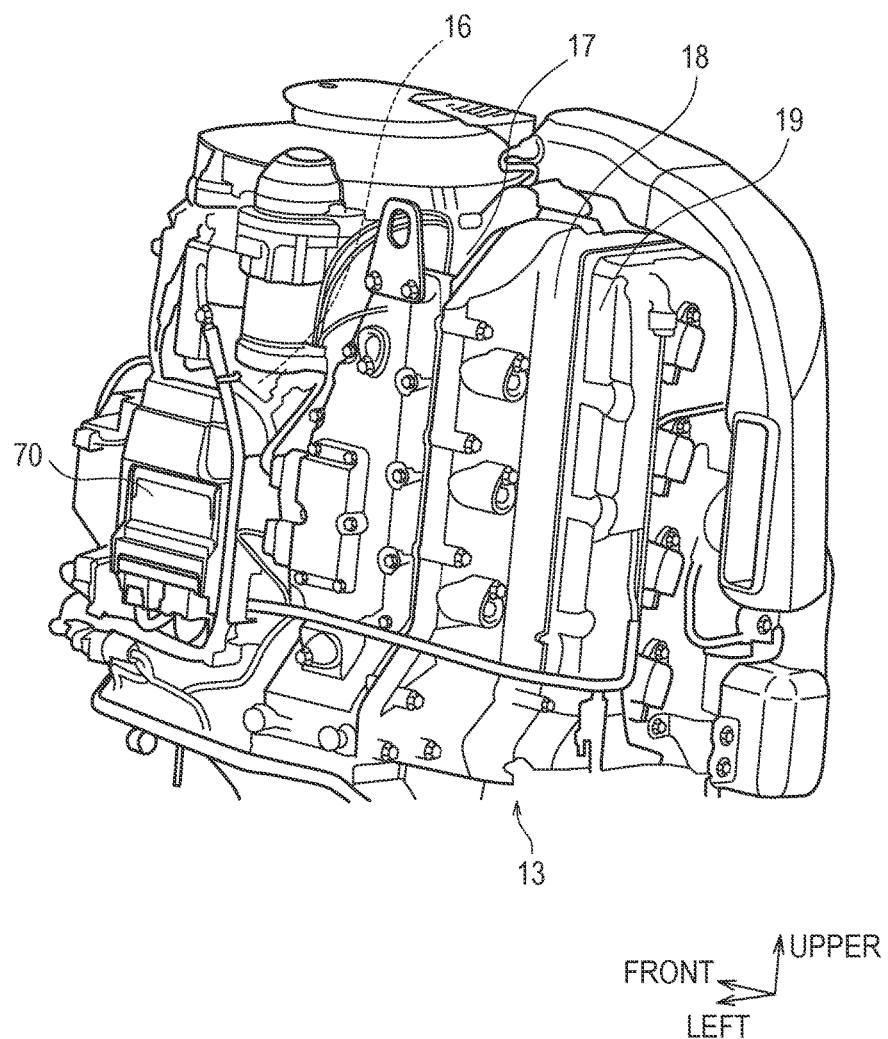
FIG. 2 is a perspective view illustrating an exemplary state where an engine cover of the outboard motor is removed.

FIG. 1 is a left side view illustrating an outboard motor 10. FIG. 2 is a perspective view illustrating a state where an engine cover 15 of the outboard motor 10 is removed. In the following drawings, as necessary, an arrow "FRONT" indicates a forward direction of the outboard motor 10 as a front side, and indicates a reverse direction of the forward direction as a rear side. A left side of the outboard motor 10 is indicated by an arrow "LEFT," and a reverse direction of the left side is indicated as a right side. An upper side of the outboard motor 10 is indicated by an arrow "UPPER," and a reverse direction of the upper side is indicated as a lower side.

The outboard motor 10 is mounted to a transom 2 disposed on a rear side of a ship 1 via a bracket device 11.

The outboard motor 10 includes an engine holder 12, and the engine (internal combustion engine) 13 is installed on an upper side of the engine holder 12. On a lower side of the engine holder 12, an oil pan 14 is arranged. An engine cover 15 covers a peripheral area of the engine 13, the engine holder 12, and the oil pan 14 of the outboard motor 10. The engine 13 is configured by coupling a crankcase 16, a cylinder block 17, a cylinder head 18, and a cylinder head cover 19. The engine 13 is, for example, a water cooled, four cycle, four cylinder DOHC engine, and is a vertical (longitudinal) engine where a crankshaft 20 is approximately vertically disposed.

On a lower portion of the oil pan 14, a drive shaft housing 21 is installed. In the engine holder 12, the oil pan 14, and the drive shaft housing 21, a drive shaft 22 is approximately vertically disposed, and the drive shaft 22 has an upper end portion coupled to a lower end portion of the crankshaft 20. The drive shaft 22 is configured to extend downward in the drive shaft housing 21, and to drive a propeller 26 via a bevel gear 24 and a propeller shaft 25 in a gear case 23 disposed on a lower portion of the drive shaft housing 21.

The cylinder block 17 includes reciprocating pistons 27 coupled to the crankshaft 20. The piston 27 has a top where a combustion chamber is formed, and the combustion chamber includes a secured spark plug. The cylinder head 18 includes intake ports and exhaust ports communicated with the combustion chambers.

The intake port includes an intake valve configured to open and close so as to supply mixture to the combustion chamber. The intake port includes an injector arranged on an upstream of the intake port to inject fuel to intake air. In the middle of an intake air pipe, a throttle body is arranged. On the other hand, the exhaust port includes an exhaust valve configured to open and close so as to discharge exhaust gas from the combustion chamber.

The mixture supplied to the combustion chamber is ignited by the spark plug to burn, thus the piston 27 reciprocates. The reciprocation of the piston 27 is converted to the rotation of the crankshaft 20.

As illustrated in FIG. 2, on a left side surface of the crankcase 16, the engine control device 70 is mounted. As the engine control device 70, an ECU (Electronic Control Unit) may be used. The engine control device 70 of the embodiment is removably attachable for improving maintainability. As described later, the embodiment employs the engine control device 70 corresponding to the model of the engine 13.

Figure 3:
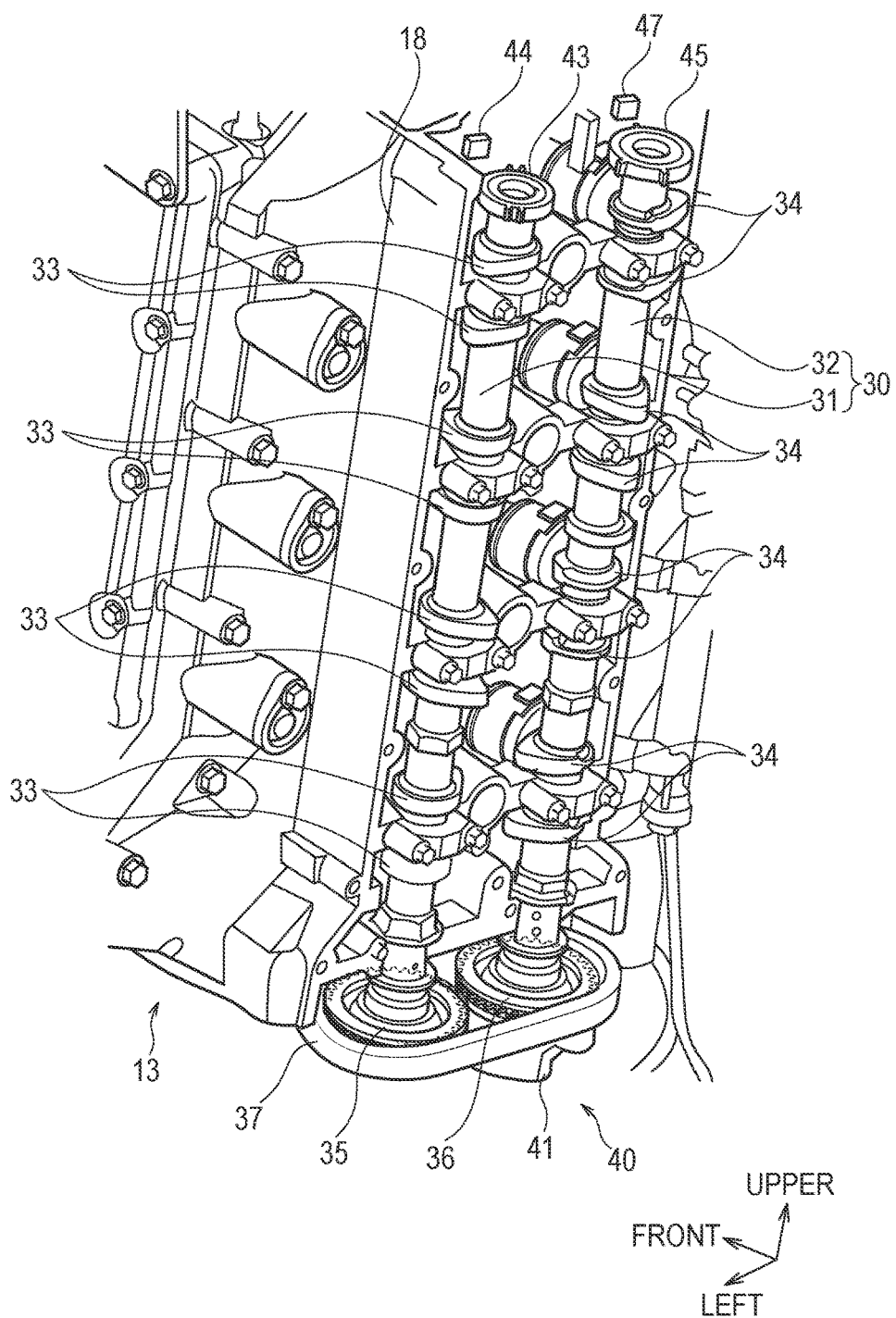
FIG. 3 is a perspective view illustrating an exemplary state where a cylinder head cover of an engine is removed.

FIG. 3 is a perspective view illustrating a state where the cylinder head cover 19 is removed from the engine 13 illustrated in FIG. 2. As illustrated in FIG. 3, the cylinder head 18 rotatably journals the camshaft unit 30 that includes cams for each driving the intake valve and the exhaust valve of the cylinder. The camshaft unit 30 of the embodiment includes an exhaust side camshaft 31 as a first camshaft, and an intake side camshaft 32 as a second camshaft. The exhaust side camshaft 31 and the intake side camshaft 32 are disposed to be separated to right and left each having an axial direction parallel to the crankshaft 20.

The exhaust side camshaft 31 and the intake side camshaft 32 include a pair of cams 33 and a pair of cams 34 by each cylinder respectively. The cams 33 and the cams 34 press tappets for driving to open and close the exhaust valves and the intake valves respectively.

The exhaust side camshaft 31 and the intake side camshaft 32 have lower ends as end portions on one side in an axial direction where cam sprockets 35 and 36 are fastened respectively. A timing chain 37 has one side wound around the cam sprockets 35 and 36. The timing chain 37 has another side wound around a crank sprocket secured to the crankshaft 20. Accordingly, the rotation of the crankshaft 20 causes the exhaust side camshaft 31 and the intake side camshaft 32 to rotate via the timing chain 37 and the cam sprockets 35 and 36. The rotations of the exhaust side camshaft 31 and the intake side camshaft 32 cause the cam 33 and the cam 34 to drive to open and close the exhaust valve and the intake valve at a predetermined timing respectively.

The engine 13 includes a variable valve timing device (VVT: Variable Valve Timing) 40. The variable valve timing device 40 changes an opening and closing timing of the exhaust valve or the intake valve, which are driven to open and close by the cams 33 and 34, thus changing phases at opening and closing with respect to a crank angle. The variable valve timing device 40 of the embodiment is mounted to the intake side camshaft 32, and is arranged on the lower end of the intake side camshaft 32 as the end portion on the one side. Accordingly, the variable valve timing device 40 changes the opening and closing timing of the intake valve, which is driven to open and close by the cam 34 of the intake side camshaft 32, so as to be advanced or retarded. However, the variable valve timing device 40 may be mounted to the exhaust side camshaft 31 to change the opening and closing timing of the exhaust valve, not limited to the case of changing the opening and closing timing of the intake valve.

The variable valve timing device 40 includes a control valve as a drive unit and a cam phase converter 41 as a driven unit. The control valve sends hydraulic pressure generated by driving the engine 13 to the cam phase converter 41. The cam phase converter 41 includes a housing integrally disposed to the cam sprocket 35, and a vane that is rotatable in the housing in a range of a predetermined angle and coupled to the intake side camshaft 32. The control valve sends the hydraulic pressure between the housing and the vane, thus the vane rotates to the advanced side or the retarded side in the housing in the range of the predetermined angle. That is, the intake side camshaft 32, to which the vane is coupled, rotates to the advanced side or the retarded side with respect to the cam sprocket 35, which includes the housing, so as to change the timing of driving to open and close the intake valve. The variable valve timing device 40 is not necessarily a hydraulic type, and may be an electrically operated type driven by a battery of the outboard motor 10.

The exhaust side camshaft 31 has an upper end side in the axial direction formed in a shape for cylinder determination. Specifically, the exhaust side camshaft 31 has an upper end to which a sensor rotor 43 for the cylinder determination is secured. The sensor rotor 43 has a ring shape, and is secured in a state of being engaged to an outer periphery of the exhaust side camshaft 31. Accordingly, the sensor rotor 43 rotates synchronized with the rotation of the exhaust side camshaft 31. The sensor rotor 43 has a plurality of protrusions projecting from the outer peripheral surface in a radial direction. The engine 13 includes a first sensor 44 as a first detecting unit for detecting the sensor rotor 43 on a position close to the sensor rotor 43. As the first sensor 44, for example, a gap sensor may be employed. The first sensor 44 detects the rotating sensor rotor 43 to transmit the detected signal to the engine control device 70. For example, the first sensor 44 transmits pulse signals to the engine control device 70 every time when the first sensor 44 detects the protrusion of the rotating sensor rotor 43.

The engine control device 70 determines at which timing each cylinder is among air intaking, compressing, burning, and air exhausting based on the signal from the first sensor 44.

On the other hand, the intake side camshaft 32 has an upper end side in the axial direction formed in a shape for variable valve timing control. Specifically, the intake side camshaft 32 has an upper end to which a sensor rotor 45 for the variable valve timing control is secured. The sensor rotor 45 has a ring shape, and is secured in a state of being engaged to an outer periphery of the intake side camshaft 32. Accordingly, the sensor rotor 45 rotates synchronized with the rotation of the intake side camshaft 32. The sensor rotor 45 has a plurality of protrusions for the variable valve timing control projecting from the outer peripheral surface in a radial direction. The engine 13 includes a second sensor 47 as a second detecting unit for detecting the sensor rotor 45. As the second sensor 47, for example, a gap sensor may be employed. The second sensor 47 detects the rotating sensor rotor 45 to transmit the detected signal to the engine control device 70. For example, the second sensor 47 transmits pulse signals to the engine control device 70 every time when the second sensor 47 detects the protrusion for the variable valve timing control of the rotating sensor rotor 45.

The engine control device 70 is configured to detect the actual rotating state of the intake side camshaft 32 based on the signal from the second sensor 47. Accordingly, the engine control device 70 detects the actual rotating state of the detected intake side camshaft 32, while controlling the opening and closing timing of the intake valve so as to be changed by advancing or retarding via the variable valve timing device 40.

Further, the sensor rotor 45 of the embodiment has a shape for discriminating the engine model in addition to the shape for the variable valve timing control. Specifically, the sensor rotor 45 secured to the intake side camshaft 32 has a protrusion for model discrimination. The protrusion for the model discrimination projects from the outer peripheral surface of the sensor rotor 45 in the radial direction similar to the protrusions for the variable valve timing control. The arrangement or the number of the protrusions for the model discrimination is different corresponding to the engine model.

Here, with reference to FIG. 4A to FIG. 4C, a description will be given of an exemplary sensor rotor that has the protrusions for the model discrimination whose arrangement is different corresponding to the engine model.

Figures 4A, 4B, 4C:
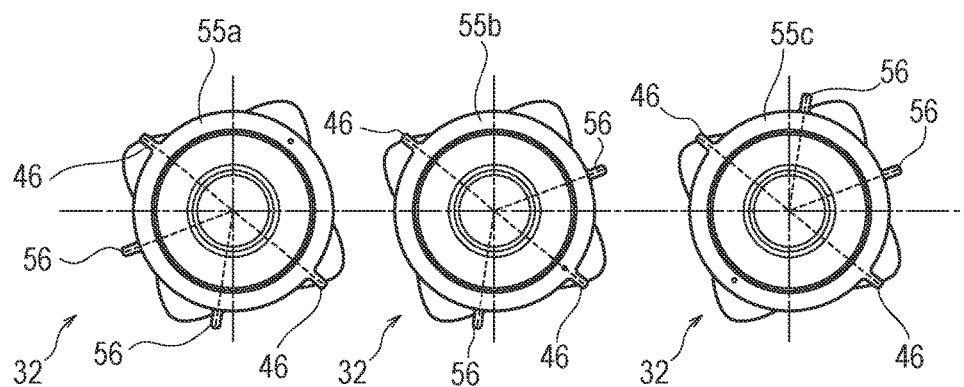
FIG. 4A is a drawing illustrating an exemplary camshaft on an air intake side.
FIG. 4B is a drawing illustrating an exemplary camshaft on an air intake side.
FIG. 4C is a drawing illustrating an exemplary camshaft on an air intake side.

FIG. 4A to FIG. 4C are drawings illustrating the intake side camshafts 32 viewed from a side on which the sensor rotor is disposed.

FIG. 4A illustrates an exemplary intake side camshaft of a low-power engine.

FIG. 4B illustrates an exemplary intake side camshaft of a medium-power engine.

FIG. 4C illustrates an exemplary intake side camshaft of a high-power engine.

Sensor rotors 55a to 55c, which are secured to the intake side camshafts 32 in FIG. 4A to FIG. 4C, include protrusions 46 for the variable valve timing control disposed on identical positions. Specifically, the two protrusions 46 for the variable valve timing control are disposed on positions facing across an axial center of the intake side camshaft 32.

On the other hand, as illustrated in FIG. 4A to FIG. 4C, protrusions 56 for the model discrimination are disposed on positions different from one another. In FIG. 4A, the two protrusions 56 for the model discrimination are equally spaced between the two protrusions 46 for the variable valve timing control. In FIG. 4B, the two protrusions 56 for the model discrimination are equally spaced across one protrusion 46 of the two protrusions 46 for the variable valve timing control. In FIG. 4C, the two protrusions 56 for the model discrimination are disposed on positions symmetrical to FIG. 4A.

Next, with reference to FIG. 5A to FIG. 5C, a description will be given of an exemplary sensor rotor that has the protrusions for the model discrimination whose number is different corresponding to the engine model.

Figures 5A, 5B, 5C:
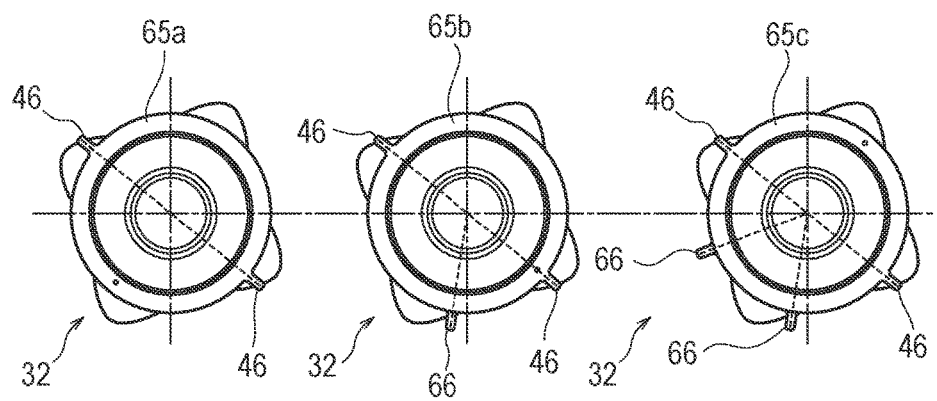
FIG. 5A is a drawing illustrating an exemplary camshaft on the air intake side.
FIG. 5B is a drawing illustrating an exemplary camshaft on the air intake side.
FIG. 5C is a drawing illustrating an exemplary camshaft on the air intake side.

FIG. 5A to FIG. 5C are drawings illustrating the intake side camshafts 32 viewed from a side on which the sensor rotor is disposed.

FIG. 5A illustrates an exemplary intake side camshaft of a low-power engine.

FIG. 5B illustrates an exemplary intake side camshaft of a medium-power engine.

FIG. 5C illustrates an exemplary intake side camshaft of a high-power engine.

Sensor rotors 65a to 65c, which are secured to the intake side camshafts 32 in FIG. 5A to FIG. 5C, include protrusions 46 for the variable valve timing control disposed on identical positions. Specifically, the two protrusions 46 for the variable valve timing control are disposed on positions facing across the axial center of the intake side camshaft 32.

On the other hand, as illustrated in FIG. 5A to FIG. 5C, the number of protrusions 66 for the model discrimination is different from one another. In FIG. 5A, the protrusion for the model discrimination is not disposed. In FIG. 5B, one protrusion 66 for the model discrimination is disposed. In FIG. 5C, two protrusions 66 for the model discrimination are disposed.

Thus, the intake side camshaft 32 assembled by being changed for each model provide the engine 13 manufactured corresponding to the model.

The protrusions 56 and 66 for the model discrimination illustrated in FIG. 4A to FIG. 4C and FIG. 5A to FIG. 5C are detected by the second sensor 47 that detects the protrusion 46 for the variable valve timing control. That is, the second sensor 47 doubles as the sensor that detects the protrusion 46 for the variable valve timing control and the sensor that detects the protrusions 56 and 66 for the model discrimination. The second sensor 47 transmits pulse signals to the engine control device 70 every time when the second sensor 47 detects the protrusions 56 and 66 for the model discrimination of the rotating sensor rotor 45.

Accordingly, the engine control device 70 can obtain model information on the engine 13 based on the signals from the second sensor 47.

Next, a description will be given of the configuration of the engine control device 70 with reference to FIG. 6.

Figure 6:
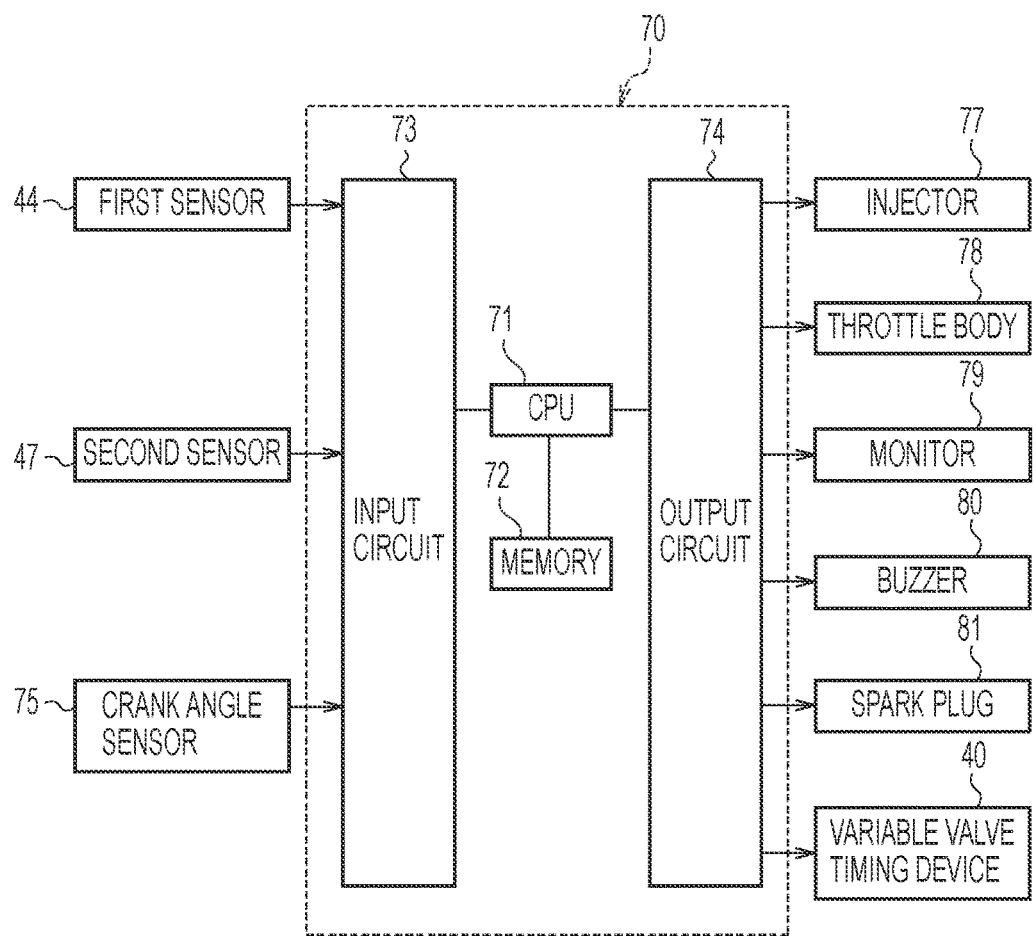
FIG. 6 is a drawing illustrating an exemplary configuration of an engine control device.

As illustrated in FIG. 6, the engine control device 70 includes a CPU 71, a memory 72, an input circuit 73, an output circuit 74, and similar unit.

The CPU 71 is what is called a computer, and executes programs stored in the memory 72 to control the engine 13 based on the signals transmitted from the respective sensors and similar unit. The CPU 71 executes the programs stored in the memory 72 to configure an obtaining unit, a determining unit, and a control unit described later.

The memory 72 includes a ROM, a RAM, an EEPROM, and similar unit.

The memory 72 stores a program executed by the CPU 71 to control the engine 13. The memory 72 of the embodiment stores the program corresponding to the model of the engine 13. Specifically, the memory 72 of the engine control device 70 mounted to the low-power engine stores a program for controlling the low-power engine. The memory 72 of the engine control device 70 mounted to the medium-power engine stores a program for controlling the medium-power engine. The memory 72 of the engine control device 70 mounted to the high-power engine stores a program for controlling the high-power engine. That is, the memory 72 does not store programs for controlling the engine 13 of the different model, thus ensuring the storage capacity to be decreased, so as to reduce the cost of the engine control device 70.

Furthermore, the memory 72 stores model information corresponding to the model of the engine 13. Here, a description will be given with a case where the intake side camshaft 32 includes the protrusions 66 for the model discrimination, the number of which corresponds to the model of the engine 13, as the sensor rotors 65*a* to 65*c* illustrated in FIG. 5A to FIG. 5C.

Specifically, the memory 72 of the engine control device 70 mounted to the low-power engine stores information of "0" as a number identical to the number of the protrusions 66 for the model discrimination illustrated in FIG. 5A. The memory 72 of the engine control device 70 mounted to the medium-power engine stores information of "1" as a number identical to the number of the protrusions 66 for the model discrimination illustrated in FIG. 5B. The memory 72 of the engine control device 70 mounted to the high-power engine stores information of "2" as a number identical to the number of the protrusions 66 for the model discrimination illustrated in FIG. 5C.

The input circuit 73 accepts the signals from the various sensors and similar unit inside and outside the outboard motor 10. Specifically, the first sensor 44 outputs a signal when the first sensor 44 detects the protrusion for the cylinder determination of the sensor rotor 43. The second sensor 47 outputs a signal when the second sensor 47 detects the protrusion for the variable valve timing control of the sensor rotor 45. The second sensor 47 outputs a signal when the second sensor 47 detects the protrusion of the sensor rotor 45 for the model discrimination of the engine 13. A crank angle sensor 75 outputs a signal corresponding to an angle of the crankshaft 20.

The output circuit 74 transmits the signals for controlling an injector 77, a throttle body 78, a monitor 79, a buzzer 80, a spark plug 81, and the variable valve timing device 40. The CPU 71 performs operations based on the signals from the respective sensors input via the input circuit 73, and outputs the signals based on the operations to the respective units via the output circuit 74. Specifically, the CPU 71 outputs a signal of fuel injection quantity to the injector 77. The CPU 71 outputs a signal of intake air amount to the throttle body 78. The CPU 71 outputs a signal of information to be indicated and similar signal to the monitor 79, and outputs a signal of a sound to be generated and similar signal to the buzzer 80. Furthermore, the CPU 71 outputs an ignition signal to the spark plug 81.

Thus, in the embodiment, at least the memory 72 of the engine control device 70 stores the program corresponding to the model of the engine 13 and the model information corresponding to the model of the engine 13. That is, the engine control device 70 is prepared corresponding to the model of the engine 13, and the engine control device 70 corresponding to the model of the engine 13 is mounted when the engine 13 is manufactured.

In the engine 13 configured as described above, the engine control device 70 for the high-power engine mounted to the low-power engine modifies the low-power engine to the high-power engine. Therefore, the engine control device 70 of the embodiment is configured to prevent the modification by replacing to the engine control device 70 of the engine 13 of the different model.

Figure 7:
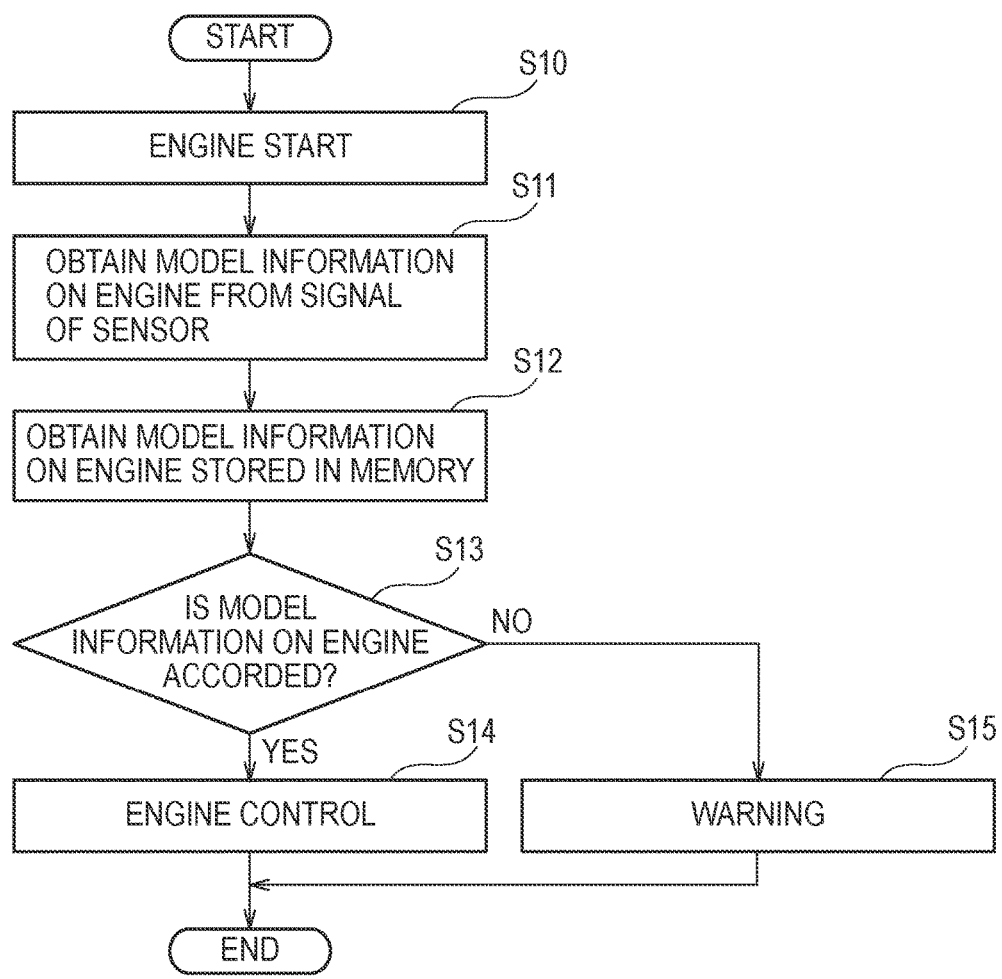
FIG. 7 is a flowchart indicating a process of the engine control device.

The following describes processes of the engine control device 70 to prevent the modification by replacing to the engine control device 70 of the engine 13 of the different model with reference to a flowchart in FIG. 7. The flowchart in FIG. 7 is achieved by the CPU 71 of the engine control device 70 to execute the program stored in the memory 72. In the following description, as illustrated in FIG. 5A to FIG. 5C, it is assumed that the sensor rotor 45 on the intake side includes the protrusion 66 for the model discrimination, the number of which is different corresponding to the model of the engine 13.

In S10, the CPU 71 of the engine control device 70 starts the engine 13 corresponding to a command of engine start by a user. Starting the engine 13 rotates the crankshaft 20, the exhaust side camshaft 31, and the intake side camshaft 32. The second sensor 47 starts detecting the protrusion 66 for the model discrimination of the sensor rotor 45 secured to the intake side camshaft 32.

In S11, the CPU 71 obtains the model information on the engine 13 based on the signal from the second sensor 47. The process corresponds to an exemplary process performed by the obtaining unit. Specifically, the CPU 71 obtains the number of the protrusions 66 for the model discrimination as the model information. For example, as illustrated in FIG. 5A, when the engine 13 is the low-power engine, the number of the protrusions 66 for the model discrimination is "0." Accordingly, the signal generated when the second sensor 47 detects the protrusion 66 for the model discrimination is not input to the CPU 71, thus the CPU 71 obtains the information of "0" as the model information. On the other hand, as illustrated in FIG. 5B, when the engine 13 is the medium-power engine, the number of the protrusions 66 for the model discrimination is "1." Accordingly, the signal generated when the second sensor 47 detects the protrusion 66 for the model discrimination is input to the CPU 71 once every time when the intake side camshaft 32 rotates once, thus the CPU 71 obtains the information of "1" as the model information. When the engine 13 is the high-power engine, the CPU 71 obtains the information of "2" as the model information.

The signals from the second sensor 47 include the signal generated when the protrusion 46 for the variable valve timing control is detected and the signal generated when the protrusion 66 for the model discrimination is detected. Accordingly, the CPU 71 is required to determine whether the signal from the second sensor 47 is the signal generated when the protrusion 46 for the variable valve timing control is detected or the signal generated when the protrusion 66 for the model discrimination is detected based on the signal from the crank angle sensor 75. For example, the CPU 71 determines the signal output at regular intervals for each rotation of the crankshaft 20 to be the signal generated when the protrusion 46 for the variable valve timing control is detected. On the other hand, the CPU 71 determines the signal output for every two rotations of the crankshaft 20 to be the signal generated when the protrusion 66 for the model discrimination is detected.

In S12, the CPU 71 obtains the model information on the engine 13 preliminarily stored in the memory 72. Specifically, the CPU 71 obtains the information of any of "0" to "2" as the number identical to the number of the protrusions 66 for the model discrimination.

In S13, the CPU 71 determines whether the model information on the engine 13 obtained based on the signal from the second sensor 47 in S11 matches the model information, stored in the memory 72, of the engine 13 obtained in S12. This process corresponds to an exemplary process performed by the determining unit. Usually, the model information on the engine 13 obtained based on the signal from the second sensor 47 matches the model information stored in the memory 72. However, when the engine control device 70 is replaced, the model information is not matched because the engine control device 70 stores the model information different from the model information on the engine 13. For example, when the engine control device 70 of the high-power engine is installed on the low-power engine, while the information of "0" is obtained as the model information on the engine 13 in S11, the information of "2" stored in the memory 72 is obtained in S12. Thus, when the engine control device 70 is replaced, the model information on the engine 13 obtained based on the signal from the second sensor 47 does not match the model information stored in the memory 72.

When the model information on the engine 13 obtained based on the signal from the second sensor 47 matches the model information stored in the memory 72, the process proceeds to S14, and in the case of not being matched, the process proceeds to S15.

In S14, the CPU 71 controls the engine corresponding to the model information determined to be matched. This process corresponds to an exemplary process performed by the control unit. That is, when the model information on the engine 13 obtained based on the signal from the second sensor 47 matches the model information stored in the memory 72, the engine control device 70 is not replaced, thus the CPU 71 ordinarily controls the engine 13 based on the stored program.

In S15, the CPU 71 gives a warning to the user. This process corresponds to an exemplary process performed by the control unit. That is, when the model information on the engine 13 obtained based on the signal from the second sensor 47 does not match the model information stored in the memory 72, it is highly possible that the engine control device 70 is illegally replaced, thus the CPU 71 gives the warning to the user that a different engine control device 70 is installed. Here, the warning includes a notification such as displaying on the monitor 79, displaying a warning light, and making a sound and a voice via the buzzer 80 and similar unit, and includes halting the start of the engine 13 and restricting the output of the engine 13 such that the rotation speed of the crankshaft 20 does not increase to a predetermined rotation speed or more. Specifically, for restricting the output of the engine 13, for example, the CPU 71 controls a throttle valve of the throttle body 78 so as not to open by a predetermined angle or more. The CPU 71 may combine a plurality of the above processes, for example, displaying on the monitor 79 simultaneously with the restriction of the output of the engine.

Accordingly, the user recognizes that the different engine control device 70 is installed.

While the case where the number of the protrusions 66 for the model discrimination is different corresponding to the model of the engine 13 is described here, not limiting to this, the CPU 71 can similarly obtain the model information even in the case where the arrangement of the protrusions 56 for the model discrimination is different. For example, as illustrated in FIG. 4A, in the case where the engine 13 is the low-power engine, the two protrusions 56 for the model discrimination are equally spaced between the two protrusions 46 for the variable valve timing control. Accordingly, when the signal on the detection of the protrusion 56 for the model discrimination is input to the CPU 71 twice between the signals generated when the second sensor 47 detects the protrusion 46 for the variable valve timing control, the CPU 71 obtains the information of "0" as the model information. On the other hand, as illustrated in FIG. 4B, in the case where the engine 13 is the medium-power engine, the one protrusion 56 for the model discrimination is located between the two protrusions 46 for the variable valve timing control. Accordingly, when the signal on the detection of the protrusion 56 for the model discrimination is input to the CPU 71 only once between the signals generated when the second sensor 47 detects the protrusion 46 for the variable valve timing control, the CPU 71 obtains the information of "1" as the model information. In the case where the engine 13 is the high-power engine, the CPU 71 obtains the information of "2" as the model information. The information on the signal on the detection of the protrusion 56 for the model discrimination is associated with the information of "0" to "2" as the model information to be stored in the memory 72. Accordingly, the CPU 71 reads out the model information associated with the information on the signal on the detection of the protrusion 56 for the model discrimination from the memory 72, thus obtaining the model information.

As described above, the engine control device 70 of the embodiment obtains the model information on the engine 13 based on the signal from the second sensor 47 that detects the rotation of the camshaft unit 30, and the engine control device 70 determines whether the obtained model information matches the stored model information. In the case of not being matched, the engine control device 70 gives the warning to the user, while controlling the engine 13 corresponding to the stored model information in the case of being matched. Accordingly, when the engine control device 70 is illegally replaced, the warning is given, thus the replacement of the engine control device 70 by the user is prevented or reduced. The memory 72 is not required to store a plurality of programs corresponding to the engine models, thus the storage capacity of the memory 72 is decreased so as to save the cost of the engine 13 and the engine control device 70.

While the case where the engine 13 is a DOHC engine is described in the embodiment, not limiting to the case, the engine 13 may be a SOHC engine. The SOHC engine includes one camshaft, thus the one camshaft may have a shape corresponding to the model of the engine 13.

The engine 13 of the embodiment includes the first sensor 44 that detects the rotation of the camshaft unit 30 for the cylinder determination, and the second sensor 47 that detects the rotation of the camshaft unit 30 for obtaining the model information on the engine 13. This ensures the engine control device 70 to accurately perform the cylinder determination based on the signal from the first sensor 44 and to accurately obtain the model information on the engine 13 based on the signal from the second sensor 47.

In the case of the SOHC engine, the one camshaft may have a shape for the cylinder determination and a shape corresponding to the model of the engine 13 on different positions. In this case, the first sensor 44 and the second sensor 47 detect the rotations of the camshaft unit 30 on portions different from one another.

The engine 13 of the embodiment uses the first sensor 44 to detect the rotation of the exhaust side camshaft 31 that has the shape for the cylinder determination, and uses the second sensor 47 to detect the rotation of the intake side camshaft 32 that has the shape corresponding to the model of the engine 13. This ensures the engine control device 70 to perform the cylinder determination and further obtain the model information on the engine 13 based on the signals from the respective sensors that detect the rotations of the camshafts even in the case where the engine 13 is the DOHC engine.

In the engine 13 of the embodiment, the intake side camshaft 32 includes the sensor rotor 45 detected by the second sensor 47, and the sensor rotor 45 includes the protrusions 56 and 66 differently arranged or disposed with the different number corresponding to the model of the engine 13. This ensures the engine 13 to be easily formed in the shape corresponding to the model. When the sensor rotor 45 includes the protrusions 66 the number of which is different for each model of the engine 13, it is preferred that the number of the protrusions 66 is decreased as the power of the engine is low, and the number of the protrusions 66 is increased as the power of the engine is high. Disposing such number of the protrusions 66 prevents the modification to the high-power engine by shaving the protrusion 66.

In the engine 13 of the embodiment, the second sensor 47 doubles as the sensor that detects the shape for controlling the variable valve timing device 40 and the sensor that detects the shape corresponding to the engine model. This ensures the cost reduction of the engine 13 compared with the case where a plurality of the sensors are disposed.

The engine control device 70 of the embodiment performs the control so as to restrict the output of the engine 13 or halt the start of the engine 13 as the warning when the model information obtained based on the signal from the second sensor 47 does not match the stored model information. This prevents or reduces the replacement of the engine control device 70 by the user.

While the present invention has been described using various embodiments above, the present invention is not limited only to these embodiments. Changes and similar modification are possible within the scope of the present invention.

While an example of the engine 13 of the outboard motor 10 has been described in the above embodiment, the present invention may be applied to engines mounted to a motorcycle, a three-wheeled automobile, a four-wheeled vehicle, and similar vehicle.

While an example of the four-cylinder engine has been described in the above embodiment, the engine may be the other multiple-cylinder engine or a single-cylinder engine.

While the case where the model of the engine 13 includes three types of the low-power engine, the medium-power engine, and the high-power engine has been described in the above embodiment, the engine model may include two types (the low-power engine and the high-power engine) or four types or more.

While the case where the engine 13 includes the variable valve timing device 40 has been described in the above embodiment, the variable valve timing device 40 may be omitted.

While the case where the intake side camshaft 32 has the shape corresponding to the model of the engine 13 has been described in the above embodiment, the exhaust side camshaft 31 may have the shape corresponding to the model of the engine 13.

According to the present invention, the illegal replacement of the engine control device is prevented or reduced without increasing the storage area for storing the programs.

What is claimed is:

1. An engine control device comprising:
    an obtaining unit that obtains model information on an engine based on a signal from a detecting unit, the detecting unit detecting a rotation of a camshaft unit;
    a determining unit that determines whether the model information obtained by the obtaining unit matches stored model information; and
    a control unit that gives a warning to a user when the determining unit determines that the model information is not matched and controls the engine corresponding to the stored model information when the determining unit determines that the model information is matched, wherein
    the camshaft unit includes a first camshaft that has a shape for cylinder determination and a second camshaft that has a shape corresponding to an engine model,
    the detecting unit includes a first detecting unit that detects a rotation of the first camshaft and a second detecting unit that detects a rotation of the second camshaft, and
    the obtaining unit obtains the model information on the engine based on a signal from the second detecting unit.

2. The engine control device according to claim 1, wherein
    the second camshaft includes a sensor rotor detected by the second detecting unit, and
    the sensor rotor includes protrusions disposed with a different count or differently arranged for each engine model.

3. The engine control device according to claim 1, wherein
    the engine has the second camshaft that includes a variable valve timing device, and
    the second detecting unit doubles as a detecting unit that detects the rotation of the second camshaft for controlling the variable valve timing device.

4. The engine control device according to claim 1, wherein
    the control unit performs the control so as to restrict an output of the engine or halt a start of the engine as the warning to the user when the determining unit determines that the model information is not matched.

5. An engine control method for an engine including a camshaft unit having a first camshaft that has a shape for cylinder determination and a second camshaft that has a shape corresponding to an engine model, a first detecting unit that detects a rotation of the first camshaft, and a second detecting unit that detects a rotation of the second camshaft, the engine control method comprising:
    obtaining model information on an engine based on a signal from the second detecting unit;

determining whether the model information obtained by the obtaining matches stored model information; and giving a warning to a user when the determining determines that the model information is not matched and controlling the engine corresponding to the stored model information when the determining determines that the model information is matched.

* * * * *